United States Patent

[11] 3,544,071

| [72] | Inventor | John S. Case |
| | | Towson, Maryland |
| [21] | Appl. No. | 816,982 |
| [22] | Filed | April 17, 1969 |
| [45] | Patented | Dec. 1, 1970 |
| [73] | Assignee | Anchor Post Products, Inc. |
| | | Baltimore, Maryland |
| | | a corporation of New Jersey |

[54] HOOK BOLT FOR FABRIC FENCE
4 Claims, 4 Drawing Figs.

| [52] | U.S. Cl. | 256/47 |
| [51] | Int. Cl. | E04h 17/12 |
| [50] | Field of Search | 256/47, 48, 32, 34, 35, 37, 40, 55, 54; 24/259, 265 |

[56] References Cited
UNITED STATES PATENTS

| 758,910 | 5/1904 | Grattelo et al. | 256/55UX |
| 1,122,829 | 12/1914 | Wernimont | 256/54UX |
| 1,188,171 | 6/1916 | Hanger | 256/37 |
| 1,631,942 | 6/1927 | Thomson | 256/47 |
| 1,738,609 | 12/1929 | Pivonski et al. | 256/37 |
| 2,152,816 | 4/1939 | Olson | 256/47X |
| 3,022,044 | 2/1962 | Gugino | 256/47 |
| 3,089,681 | 5/1963 | Smithwick | 256/47 |

*Primary Examiner*—Dennis L. Taylor
*Attorney*—Walter G. Finch

ABSTRACT: A hook bolt arrangement is provided for terminating lengths of fabric fence to a post. The desired orientation of the hook in the line of tension is preset with aid of a pinch or bite in the shank portion which cooperates with a square aperture in the post bracket.

Patented Dec. 1, 1970 3,544,071
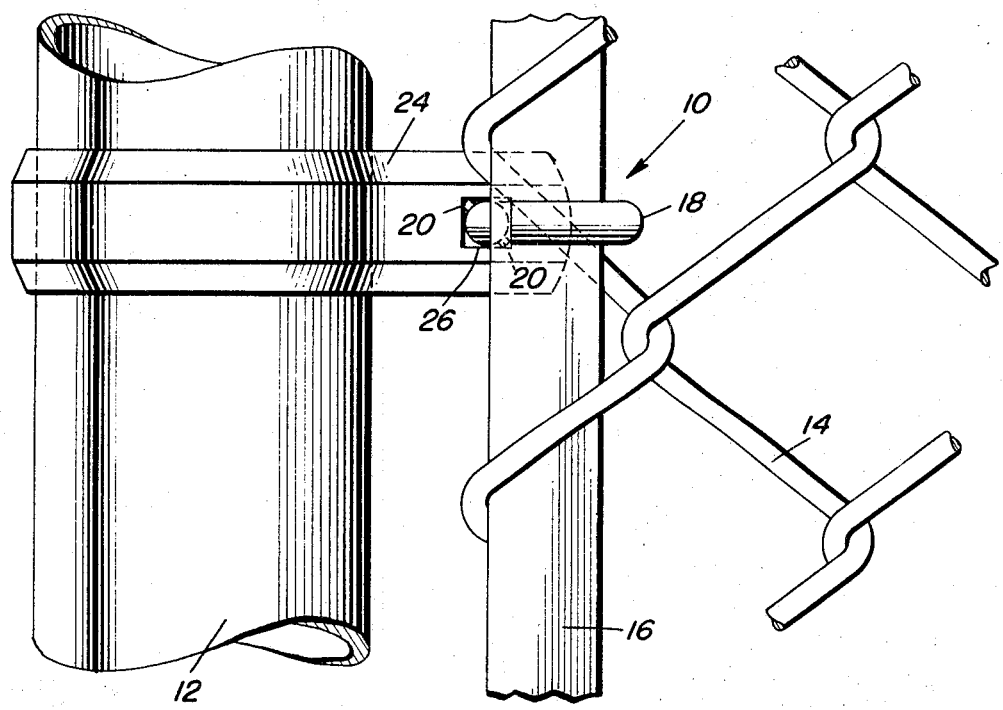
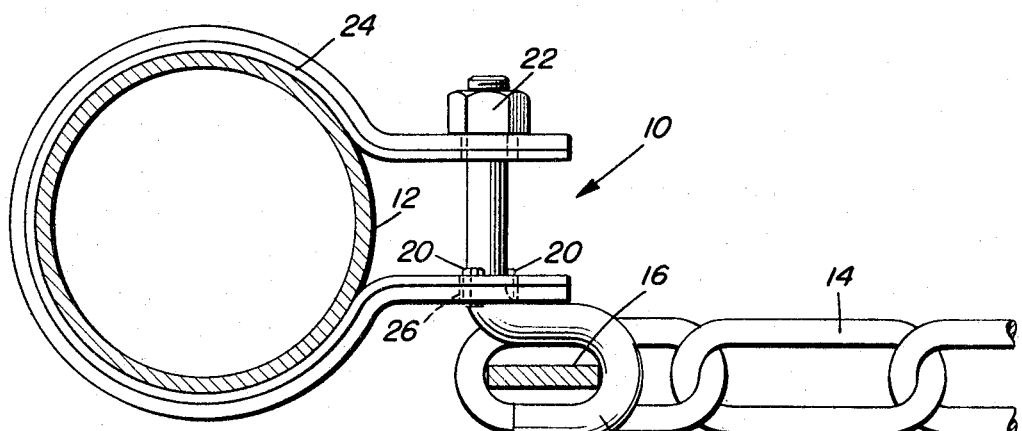
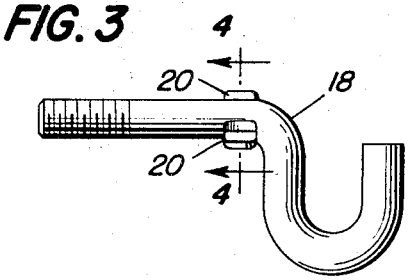
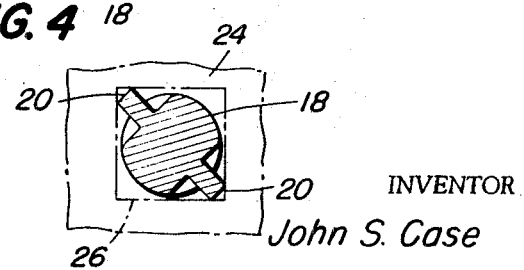
INVENTOR
John S. Case
BY Walter G. Finch
ATTORNEY

HOOK BOLT FOR FABRIC FENCE

This invention relates to fencing, and more particularly to a hook bolt arrangement for terminating lengths of chain link fabric to a post.

To economically install chain link fencing, it is desirable that the hardware be self positioning and require a minimum of skill and tools to assemble.

A source of trouble in the past has been the terminus of the link fabric at the post. Several spaced securing elements are desirable to distribute the strain. When ordinary hook arrangements are used, one or more of the hooks tend to drop out of correct attitude for capturing the termination and several hands are required to hold them in place initially. Further, when the hooks are tightened, they tend to rotate unless a wrench is applied to both ends.

It is the object of this invention, therefore, to provide a chain link terminal arrangement for attachment to a post.

Another object of the invention is to provide a stretcher bar hook bolt which will hold its desired orientation during and after installation.

To provide a hook bolt which is self positioning and requires no additional holding means when being tightened, is yet another object of the invention.

Other objects and attendant advantages of the invention will become more readily apparent and understood from the following detailed specification and single sheet of accompanying drawings in which:

FIG. 1 is a fragmentary detail elevation of a chain link fabric termination to a post incorporating features of this invention;

FIG. 2 is a top view of the elements of FIG. 1;

FIG. 3 is a side view of the hook bolt for the assembly of FIGS. 1 and 2; and

FIG. 4 is a cross section taken on line 4—4 of FIG. 3.

Referring now to the details of the invention as shown in FIGS. 1 to 4 of the drawings, reference numeral 10 indicates generally an improved chain fence termination assembly to a post 12. The link fabric 14 is traversed at the terminal end by a rod 16. A threaded hook bolt 18, which is passed through the ends of a bracket 24, embraces the post 12. One of the apertures for this purpose in the bracket 24 is a square opening 26.

The shank of hook bolt 18 is provided with oppositely extending bite portions 20 or pinches as best shown in FIG. 3. These bite portions 20 are oriented so that when received in the square opening 26 of the bracket 24 as shown in FIG. 4, the hook bolt 18 is held at a desired attitude to receive the rod 16 and hold it against the tension of the chain link fabric 14.

It will be noted this attitude obtains even before the rod 16 is installed. Therefore, all of a plurality of such hooks bolts 18 on a post 12 are similarly alined ready to receive the rod 16 without individual adjustment.

The nut 22 on the hook bolt 18 may thereafter be tightened to clamp the bracket 24 to the post 12 with no possibility of rotation of the hook attitude.

Obviously many modifications and variations of the present invention are possible in light of the above teachings. It is, therefore, to be understood that within the scope of the appended claims the invention may be practiced otherwise than as specifically described.

I claim:

1. In combination, a first member, at least one bracket positioned along said first member, said bracket having a rectilinear aperture provided therein, a second member for attachment to said first member, a hook bolt having a hook, said hook bolt being mounted in said bracket and arranged for said hook to receive the terminal end of said second member, said hook bolt being provided with at least one pinch for engagement in said rectilinear aperture of said bracket for retaining said hook of said hook bolt in a predetermined orientation with respect to said bracket and said second member.

2. The combination as recited in claim 1, wherein said first and second members are a fence post and rodded link fabric, respectively.

3. The combination as recited in claim 1, wherein a plurality of said brackets and a corresponding number of hook bolts are provided spacedly along said first and second members.

4. In combination, a post, a plurality of brackets spacedly positioned along said post, each of said brackets having a similarily oriented rectilinear aperture provided therein, a link fabric for attachment to said post, a corresponding number of hook bolts each having a hook, each said hook bolt having a similar oriented pinch mounted in the respective rectilinear oriented aperture of its respective bracket, with each hook of each hook bolt being similarly oriented to receive the terminal end of said link fabric.